United States Patent [19]

Mueller

[11] Patent Number: 5,617,411
[45] Date of Patent: Apr. 1, 1997

[54] METHOD FOR DIGITAL DATA TRANSMISSION IN THE ZERO SYMBOL OF COFDM MODULATION METHOD

[75] Inventor: Andreas Mueller, Nersingen, Germany

[73] Assignee: Daimler Benz AG, Stuttgart, Germany

[21] Appl. No.: 244,292

[22] PCT Filed: Nov. 24, 1992

[86] PCT No.: PCT/EP92/02703

§ 371 Date: Aug. 18, 1994

§ 102(e) Date: Aug. 18, 1994

[87] PCT Pub. No.: WO93/11616

PCT Pub. Date: Jun. 10, 1993

[30] Foreign Application Priority Data

Nov. 26, 1991 [DE] Germany .................. 41 38 770.8

[51] Int. Cl.⁶ .................. H04J 1/02; H04J 4/00
[52] U.S. Cl. .................. 370/210; 370/480
[58] Field of Search .................. 370/18, 19, 20, 370/21, 50, 91, 120, 70, 122, 101, 110.1, 110.4, 111, 79, 80, 82, 83, 84, 118, 69.1, 76; 375/260, 263, 261

[56] References Cited

U.S. PATENT DOCUMENTS 5,228,025  7/1993  Le Floch .................. 370/20

FOREIGN PATENT DOCUMENTS

| | | | |
|---|---|---|---|
| 0205200 | 12/1986 | European Pat. Off. | G11B 20/00 |
| 0369917 | 5/1990 | European Pat. Off. | H04L 5/02 |
| 0441730 | 8/1991 | European Pat. Off. | H04L 5/06 |
| 0441731 | 8/1991 | European Pat. Off. | H04L 5/06 |
| 3401728 | 8/1985 | Germany | H04L 5/22 |
| 3616556 | 11/1987 | Germany | H04L 7/04 |
| 2144604 | 3/1985 | United Kingdom | H04J 1/12 |

OTHER PUBLICATIONS

IEEE Transactions on Consumer Electronics vol. 35, No. 3 Aug. 1989, New York, pp. 493–503, B. Le Foch et al. "Digital Sound Broadcasting To Mobile Receivers".

EBU Review – Technical No. 224, Aug. 1987, Brussels, pp. 168–190, M. Alard and R. Lassalle "Principles of Modulation and Channel Coding for Digital Broadcasting for Mobile Receivers".

Primary Examiner—Wellington Chin
Assistant Examiner—Huy D. Vu
Attorney, Agent, or Firm—Spencer & Frank

[57] ABSTRACT

A frame oriented, digital data transmission method wherein data are transmitted in the zero symbol of the frame of the modulation method provided in the COFDM (Coded Orthogonal Frequency Division Multiplex) which is provided in digital radio. This allows for further digital data to be independently transmitted outside of the actual digital multiplex signal. The method can also be used, among other things, for transmitter identification in common frequency networks.

9 Claims, 2 Drawing Sheets

METHOD FOR DIGITAL DATA TRANSMISSION IN THE ZERO SYMBOL OF COFDM MODULATION METHOD

BACKGROUND OF THE INVENTION

The invention relates to a method for digital multi-channel data transmission with a COFDM method which operates in a frame oriented manner with the frame containing at least one zero symbol.

The method according to the invention is used in the COFDM (coded orthogonal frequency division multiplex) method provided in digital radio, for example, it may be used in connection with transmitter identification in the common wave frequency network.

A common wave frequency network is characterized in that a plurality of transmitters radiate the same signal simultaneously. The COFDM modulation method is highly immune against multipath distortions and is thus basically suitable for common wave networks.

The digital radio signal should, among other things, contain the identification of the transmitter, something which allows the receiver, for example, to determine its approximate position and to subsequently use this information, for example, in the selection of interesting traffic information. The identification of the transmitter, however, can only occur by way of the signal radiated from it. This is a problem in common-wave networks, because all transmitters in the network radiate the same multiplex signal. Signalization of the transmitter identification must therefore take place outside of the actual multiplex signal.

COFDM is a digital multi-channel modulation method. In this type of method, the data signal to be transmitted is divided into a number N (for example, several hundred) of sub-channels, which in the frequency domain lie closely adjacent to one another, with the spectra definitely overlapping one another. Due to this division, the data rate transmitted in each subchannel is only a fraction of the original data rate. The duration of the symbol increases at the same ratio or proportion. This is advantageous, if the echoes occur on the transmission path. If a sufficiently great N is selected, it is possible to obtain a duration of the symbol which is long compared with the maximal echo delay. This results in the symbol interference caused by echoes to be reduced such that the signal can be demodulated without distortion.

The COFDM transmission signal s(t) may be represented in the base band as a superposition of time and frequency-shifted base pulses b(t):

$$s(t) = \sum_i \sum_k s_{i,k} b(t - iT_s) e^{j2\pi k F_s (t - iT_s)}$$

In this case the base pulse is defined by:

$$b(t) = \begin{cases} 1 & \text{for } -t_g < t < t_s \\ 0 & \text{else,} \end{cases}$$

$j=\sqrt{-1}$ is the imaginary unit.

The summation index i represents the symbol clock pulse, and index k the subchannel. The following parameters describe the COFDM modulation method:

$T_s$: Symbol duration
$t_s$: used symbol duration
$t_s$: protection time
$F_s$: subchannel spacing They are related by way of the relationships $T_s=t_s+t_g$ and $F_s=1/t_s$. As a further characteristic parameter, the useful component, the quotient of used symbol duration and symbol duration $\gamma=t_s/T_s$ can be defined. The variants of COFDM currently discussed for use in digital radio is always $\gamma=0.8$. Taking these relationships into consideration, only one free parameter remains in the COFDM system and the remaining parameters may be derived from it.

The data to be transferred are coded in complex symbols $d_{i,k}$. In COFDM the 4-phase shift is used as the modulation method, and therefore $d_{i,k}$ {1, j −1, −j} is true. In order for the transmission not to be sensitive to channel-dependent phase rotations, transmission symbols $s_{i,k}$ which are generated by differential coding $s_{i,k}=s_{i-1,k}d_{i,k}$ are radiated rather than $d_{i,k}$. It might be practical to combine the transmission symbols of all subchannels transmitted in the same time slot i into an N-dimensional vector $s_i$. Such a vector is mentioned in the symbol block.

The generation of the COFDM transmission signal is performed, for example, digitally, with the help of the inverse fast Fourier Transformation (IFFT). The block circuit diagram of a COFDM transmitter is shown in FIG. 1a. For each time slot i an IFFT is calculated, whose output signal has the duration $t_s$. It is continued periodically on a signal of the duration $T_s$.

The COFDM demodulator serves to recover the symbols $d_{i,k}$ carrying the information. To accomplish this the values $$Y_{i,k} = \frac{1}{t_s} \int_0^{t_s} \chi(t + iT_s) e^{-j2\pi k F_s t} dt$$

are generated from the receiver input signal r(t). From these values estimated values $d_{i,k}=r^*_{i,k}r_{i-1,k}$ are obtained for the data symbols by way of differential demodulation $d_{i,k} = r^*_{i,k} r_{i-1,k}$. In this case, $r^*$ is conjugated complex to r.

The COFDM demodulator may also be realized digitally with the help of the fast Fourier transformation (FFT). It is shown in FIG. 1b. For each time slot a segment having the duration $t_s$ of the receiver signal is evaluated. A segment of the duration $t_g$ remains unevaluated. The echoes of the signal from the preceding time slot fall into this slot.

The data transmission in the COFDM system is frame oriented. A frame is a structural arrangement of symbol blocks in temporal succession. It has the following structure, which is illustrated in FIG. 2:

The first symbol block $s_1$ in the frame is the symbol zero. It is characterized in that no transmission signal is radiated. The receiver can detect the drop in field strength by means of an envelope detector. The distance between the zero symbols of the nth and the (n+1)th frame serves frame synchronization while the duration of the zero symbol serves for symbol synchronization. The zero symbol is not processed by the FFT. As a rule, its length $T_o=0.8 T_s$, deviates from $T_s$.

The second symbol block $s_2$ in the frame is the phase reference symbol. It is needed to initialize the differential demodulator, among other things.

The remaining frame comprises symbol blocks carrying information.

It is the object of the invention to provide a method of this type for the digital transmission of data and which allows for digital data to be transmitted independently outside the actual-digital multiplex system. This object generally is attained according to the present invention by a method for digital multi-channel transmission particularly, a COFDM method which operates in a fame oriented manner with the frame containing at least one zero symbol, data additionally are transmitted in at least one zero symbol. Advantageous configurations and/or modifications likewise are disclosed.

DETAILED DESCRIPTION OF THE PREFERRED EMBODIMENTS

Figure 1A:
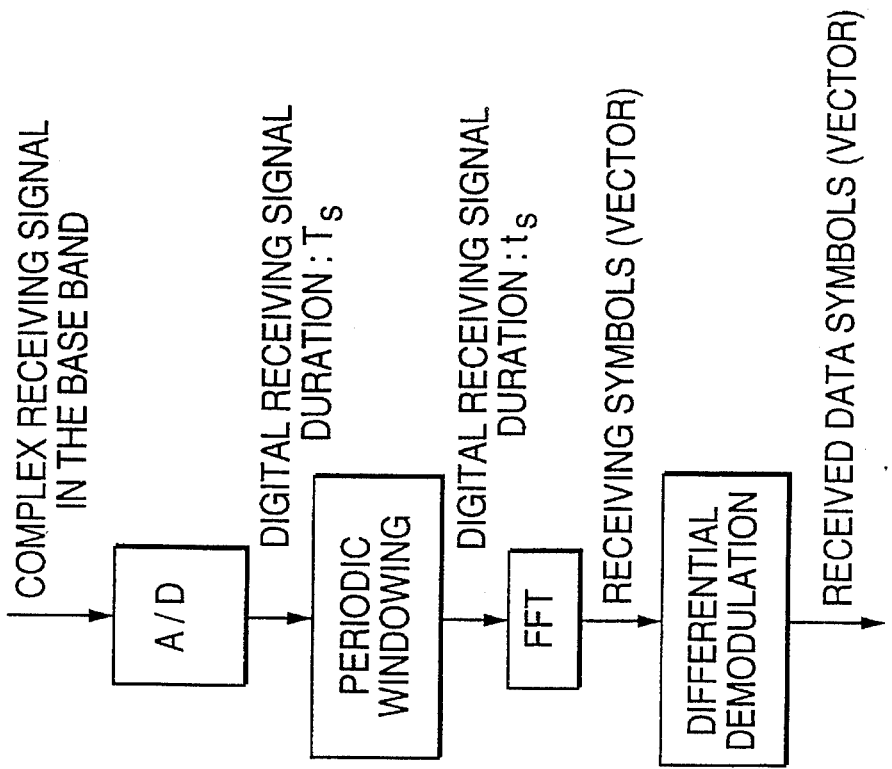
FIGS. 1a and 1b are block circuit diagrams for a transmitter and a receiver for a COFDM transmission signal.
Figure 1B:
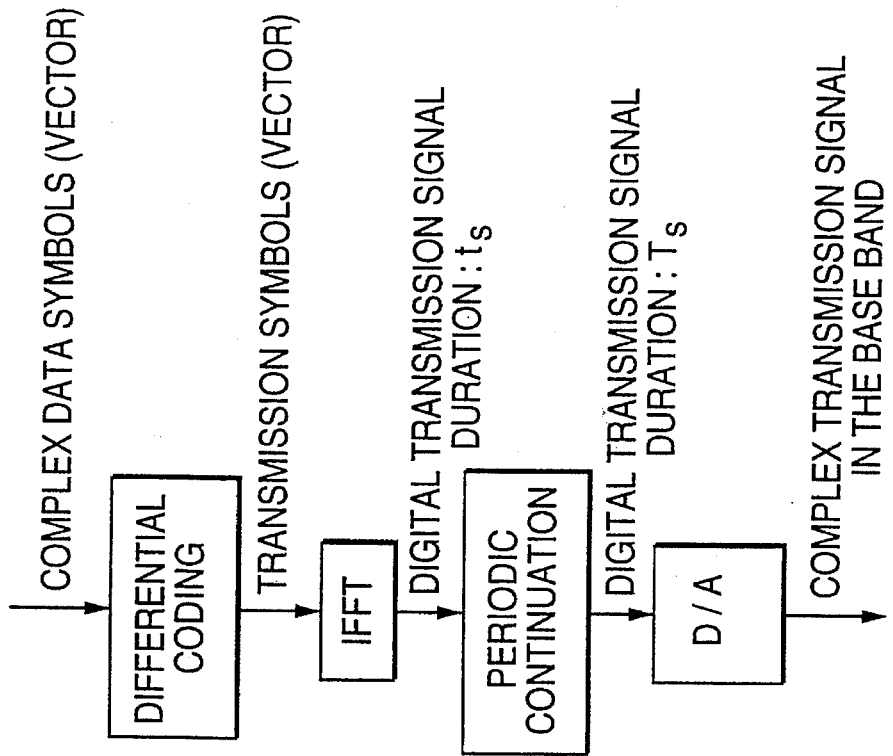
Figure 2:
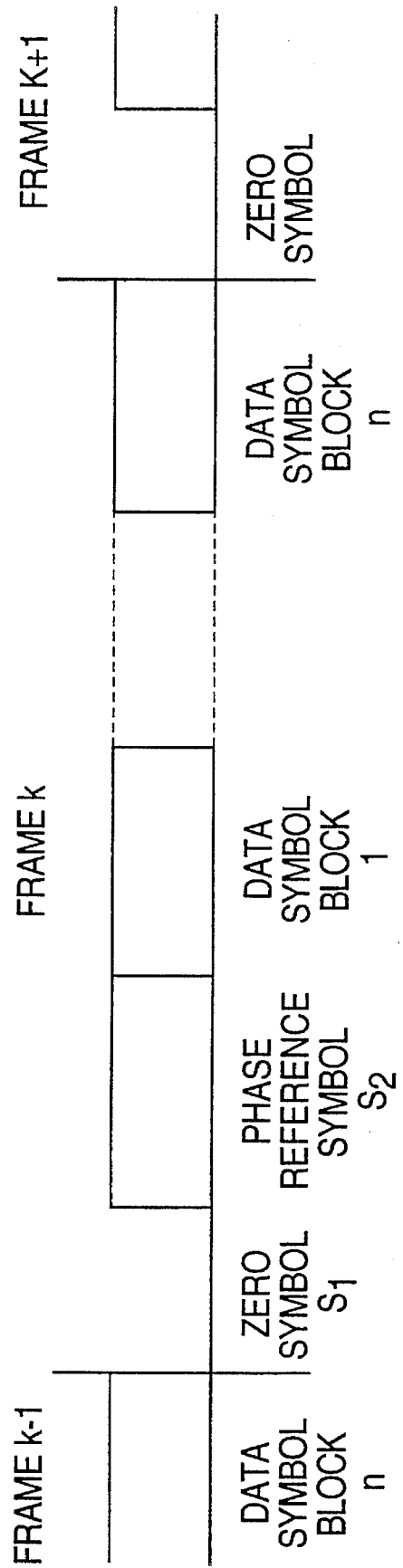
FIG. 2 illustrates the frame arrangement of temporally subsequent symbol blocks for a COFDM signal.

The method for data transmission according to the invention takes advantage of the fact that there previously was no signal in the zero symbol of the COFDM data frame. However, it is not absolutely necessary for the evaluation of the envelope that there be no such data in the zero symbol of the frame. It suffices if the signal power in the zero symbol is sufficiently small in relation to the power radiated in the remainder of the frame. Damping of the transmission power, which must be guaranteed during the zero symbol, must still be determined and is based on the performance of the analogue envelop.

Thus according to the invention, a signal having a correspondingly low level is transmitted during the zero symbol of a conventional COFDM frame. In order to ensure the flawless transmission of information despite this additional coding, additional coding and diversity measures are required.

COFDM preferably is used as the modulation method for data transmission in the zero symbol, since the required resistance to multi-path interferences is obtained in this manner. Moreover, it is advisable to use the same modulation method for this special task as the one used for the actual multiplex signal (i.e., COFDM), since this allows for the demodulator in the receiver also to be used for the demodulation of the information in the zero symbol.

However, it must also be noted that the duration $T_o$ of the zero symbol is different from the duration $T_s$ of a data symbol block. A protection time $t_{go}$ is also required for the transmission of data in the zero symbol. The shortest possible length of the protection time without influence on the transmission quality is determined by the physical characteristics of the radio channel. In order for the COFDM system to attain the greatest possible spectrum efficiency, the protection time for the normal data symbol blocks $t_g$ will accept this minimum which is not to be exceeded. However, in this case, $t_{go}$ must be at least as great as $t_g$.

The useful symbol duration in the zero symbol $t_o$ yields $t_o = T_o - t_{go} \leq T_o - t_g$ thus $t_o \leq t_s + (T_o - T_s)$. In case $T_o \geq T_s$ applies, there is no problem, because then $t_{go}$ can be determined such that $t_o = t_s$, and thus the useful symbol durations of the zero symbol and the normal data symbol block correspond. One special problem is posed if, as in the configurations presently provided for the digital radio, $T_o < T_s$ applies, since then $t_o < t_s$ necessarily follows, and thus only a shorter useful symbol duration than in the normal data symbol block is available in the zero symbol.

It has already been demonstrated in the description of the COFDM method that the subchannel spacing is precisely the reciprocal value of the useful symbol duration. This determination is absolutely necessary for the orthogonality of the subchannels. Given the case in which $t_o < t_s$, the subchannels yield greater frequency spacing than in the normal data symbol blocks. Since the entire width of the COFDM signal remains constant throughout the frame, only a small number of subchannels may be active during the zero symbol.

For example, the result of $T_o = 0.8 T_s$ and $t_o = 0.5 t_s$ is $t_{go} = 2 t_g$. Dividing the useful symbol duration in half now means to double the subchannel spacing. In order to arrive at the same band width, the number of active subchannels must be evenly divided. If the scanning rate remains the same, exactly half as many scanning values occur in the time interval $T_s$ of the length $t_o$ as in time interval $t_s$. For the modulation and demodulation, a fast Fourier Transformation (FFT) is advantageously used. The FFT length for the modulation or demodulation of the zero symbol is now exactly half as great as in the normal data symbol blocks.

The modulation method used on the subchannel may still be freely selected independent of the determinations already made. The solution according to the invention provides differential phase shifting here, which corresponds to the modulation method used for normal data transmission in the COFDM system. In this case, the data are mapped to the phase difference of adjacent symbols. In a multi-channel transmission system there are now basically two possibilities for using the phase difference either of temporally adjacent symbols or in accordance with adjacent frequencies as information carriers. Both types of differential modulation may also be used for information transmission in the zero symbol of the COFDM frame.

In differential modulation in the frequency direction, one sub-channel is the phase reference for the next. This has the advantage that both on the transmitter side as well as on the receiver side only the content of the zero symbol and no further symbol blocks of the COFDM frame for the modulation and demodulation is needed.

In differential modulation in the temporal direction, a symbol block temporally adjacent to the zero symbol is needed as a phase reference. Due to the arrangement in the COFDM frame this is advantageously the phase reference symbol of the COFDM frame. The disadvantage of this method is that for the modulation and demodulation of the data transmitted in the zero symbol, the reference to the phase reference symbol must be established. However, this disadvantage is minor, because, in practice, the receiver requires the phase-reference symbol for synchronization, in any case, and must therefore evaluate it. The differential modulation in the time direction has the advantage of being compatible with the method used for the data symbol blocks.

The method according to the invention allows, for example, the transfer of transmitter identification, but is not limited to this application.

I claim:

1. In a method for digital multi-channel transmission utilizing a COFDM (Coded Orthogonal Frequency Division Multiplex) method, and which operates in a frame oriented manner with the frame containing at least one zero symbol followed by a number of data symbol blocks, improvement comprising the additional step of transmitting additional data in at least one zero symbol; and wherein: the zero symbol transmitted has a symbol duration that deviates duration of the data symbol blocks, and at a constant band width, sub-channel spacing in the zero symbol, and thus the number of sub-channels in the zero symbol, which deviates from the number of sub-channels in the data symbol blocks; the data of the zero symbol is transmitted at a symbol duration of 80% of the data symbol duration; the data in the zero symbol having an active symbol duration, which is one half of the normal active symbol duration, is transmitted; the sub-channel spacing in the zero symbol is doubled by comparison with the sub-channel spacing in the normal data symbol blocks; and the number of sub-channels is divided in half.

2. Method according to claim 1, wherein said step of transmitting additional data includes radiating the data transmitted in the zero symbol with adequate transmission power so that coarse synchronization of a COFDM receiver is not adversely affected by the analogue evaluation of an envelope of a received COFDM signal.

3. Method according to claim 1, further comprising using the COFDM modulation method for the transmission of the additional data in the zero symbol.

4. Method according to claim 1, wherein a fast discrete Fourier transformation (FFT) is calculated for the modulation and demodulation of the data symbol blocks, and for the modulation and demodulation, an FFT is calculated in the zero symbol, with said FFT being one half the length of the FFT in the data symbol blocks.

5. In a method for digital multi-channel transmission utilizing a COFDM (Coded Orthogonal Frequency Division Multiplex) method, and which operates in a frame oriented manner with the frame containing at least one zero symbol followed by a number of data symbol blocks, the improvement comprising the additional step of transmitting additional data in at least one zero symbol; and wherein the additional data are transmitted on individual ones of sub-channels in the zero symbol in the phase-difference of adjacent sub-channels in the zero symbol.

6. In a method for digital multi-channel transmission utilizing a COFDM (Coded Orthogonal Frequency Division Multiplex) method, and which operates in a frame oriented manner with the frame containing at least one zero symbol followed by a phase reference symbol and a number of data symbol blocks, the improvement comprising the additional step of transmitting additional data in at least one zero symbols; and wherein the additional data are transmitted on individual sub-channels in the zero symbol in the phase difference between a sub-channel in the zero symbol and a corresponding sub-channel of a subsequent phase reference symbol of the frame.

7. Method according to claim 2, further comprising using the COFDM modulation method for the transmission of the additional data in the zero symbol.

8. A method according to claim 5, wherein the zero symbol transmitted has a symbol duration that deviates from the duration of the data symbol blocks, and at a constant band width, sub-channel spacing in the zero symbol, and thus the number of sub-channels in the zero symbol, which deviates from the number of sub-channels in the data symbol blocks.

9. A method according to claim 6 wherein the zero symbol transmitted has a symbol duration that deviates from the duration of the data symbol blocks, and at a constant band width, sub-channel spacing in the zero symbol, and thus the number of sub-channels in the zero symbol, which deviates from the number of sub-channels in the data symbol blocks.-.

* * * * *